US012617333B2

(12) United States Patent
Kato et al.

(10) Patent No.: US 12,617,333 B2
(45) Date of Patent: May 5, 2026

(54) LAMP CONTROLLER AND AUTOMOTIVE LAMP SYSTEM

(71) Applicant: Koito Manufacturing Co., Ltd., Tokyo (JP)

(72) Inventors: Masashi Kato, Shizuoka (JP); Hirotaka Sawada, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 326 days.

(21) Appl. No.: 18/390,036

(22) Filed: Dec. 20, 2023

(65) Prior Publication Data

US 2024/0116427 A1 Apr. 11, 2024

Related U.S. Application Data

(63) Continuation of application No. PCT/JP2022/024218, filed on Jun. 16, 2022.

(30) Foreign Application Priority Data

Jun. 22, 2021 (JP) ................................. 2021-103589

(51) Int. Cl.
*B60Q 1/08* (2006.01)
*B60Q 11/00* (2006.01)
*H05B 47/18* (2020.01)

(52) U.S. Cl.
CPC ................ *B60Q 1/08* (2013.01); *B60Q 11/00* (2013.01); *H05B 47/18* (2020.01)

(58) Field of Classification Search
CPC ...... H05B 47/155; H05B 47/12; H05B 45/50; H05B 47/17; H05B 47/20; H05B 45/14;
(Continued)

(56) References Cited

U.S. PATENT DOCUMENTS 9,873,372 B2 * 1/2018 Son ...................... B60Q 1/1423
2018/0334085 A1 11/2018 Ichikawa et al.
(Continued)

FOREIGN PATENT DOCUMENTS

JP 2014213663 A 11/2014
JP 2018172038 A 11/2018
(Continued)

OTHER PUBLICATIONS

International Preliminary Report on Patentability Chapter I (PCT/IB/373) and Written Opinion (PCT/ISA/237) with translation mailed on Dec. 14, 2023 by The International Bureau of WIPO in corresponding International Patent Application No. PCT/JP2022/024218. (8 pages).
(Continued)

*Primary Examiner* — Wei (Victor) Y Chan
(74) *Attorney, Agent, or Firm* — BUCHANAN, INGERSOLL & ROONEY PC

(57) ABSTRACT

A drawing processing unit generates multi-gradation light distribution image data that defines a light distribution. The image processing unit executes multiple software processes sequentially. The drawing processing unit self-diagnoses the presence or absence of an abnormality for each software process. The drawing processing unit transmits first diagnostic data that indicates the self-diagnosis results to the auxiliary processor. Furthermore, the drawing processing unit transmits first feedback data based on data generated for each software process to the auxiliary processor. The auxiliary processor diagnoses the presence or absence of an abnormality in the multiple software processes executed by the drawing processing unit based on the first feedback data.

9 Claims, 9 Drawing Sheets

(58) Field of Classification Search
   CPC ...... H05B 45/44; H05B 47/125; H05B 47/18;
                  B60Q 11/005; B60Q 1/08; B60Q 1/1438
   See application file for complete search history.

(56)                    References Cited

U.S. PATENT DOCUMENTS

| | | | | |
|---|---|---|---|---|
| 2019/0128497 A1* | 5/2019 | Tessnow | .............. | F21S 41/151 |
| 2019/0202344 A1* | 7/2019 | Maruyama | ............. | H05B 47/10 |

FOREIGN PATENT DOCUMENTS

| | | | |
|---|---|---|---|
| JP | 2018195448 A | 12/2018 |
| JP | 2019209706 A | 12/2019 |

OTHER PUBLICATIONS

International Search Report (PCT/ISA/210) with translation mailed on Aug. 9, 2022 by the Japanese Patent Office as the International Searching Authority for International Application No. PCT/JP2022/024218. (5 pages).

* cited by examiner

FRAME

| START | PWM PIXEL DATA | CRL | END |
|---|---|---|---|

SerIF

LAMP CONTROLLER AND AUTOMOTIVE LAMP SYSTEM

BACKGROUND

1. Technical Field

The present invention relates to an automotive lamp.

2. Related Art

Progress is being made in making headlamps more high-performance. A high-performance headlamp has a function of Adaptive Driving Beam (ADB) shading/dimming control, a function of road surface drawing, etc.

As headlamps become more high-performance, a configuration of a lamp system becomes more complex. Basically, a headlamp employs a push-type system configuration in which multiple blocks or functions each sequentially execute processing from a higher level toward a lower level based on an instruction from a higher-level Electronic Control Unit (ECU).

The Automotive Safety Integrity Level (ASIL) is defined in order to support the safety of automobiles. The ASIL is a risk classification system with respect to the functional safety of automobiles. In the ASIL, four grades, i.e., A, B, C, and D, are defined. Such a grade is defined for each component of a vehicle. The grade ASIL-B is required for a headlamp.

In order to ensure the safety of the system, an architecture, which is referred to as "1oo2D" (1 out of 2 with Diagnostics), is known. The 1oo2D architecture has been proposed based on a concept in which the system is duplicated, and even if a malfunction has occurred in one system, the normal system will be employed, thereby ensuring normal operation.

For 1oo2D, two redundant systems are required. A high-performance headlamp includes a high-performance, and therefore high-cost, microcontroller (processor). Accordingly, in a case in which a redundant system is provided, i.e., two systems are each provided with such a microcontroller and appended peripheral devices, this leads to an increased cost. Furthermore, processing and judgment are executed after a response is received from each of the two redundant processors. Accordingly, in many cases, such an arrangement tends to have a slower overall processing speed.

SUMMARY

The present disclosure has been made in view of such a situation.

An embodiment of the present disclosure relates to a lamp controller structured to control a patterning device including multiple controllable elements. The lamp controller includes: a drawing processing unit structured to generate multi-gradation light distribution image data that defines a light distribution; a device interface circuit structured to convert the light distribution image data into a serial interface signal having a signal format required by the patterning device, and to transmit the serial interface signal to the patterning device; and an auxiliary processor. The drawing processing unit is adaptive to execute multiple software processes sequentially, to execute self-diagnosis for the presence or absence of an abnormality for each software process, to transmit first diagnostic data indicative of a self-diagnosis result to the auxiliary processor, and to transmit first feedback data based on data generated for each software process to the auxiliary processor. The auxiliary processor is adaptive to execute diagnosis for the presence or absence of an abnormality in the multiple software processes executed in the drawing processing unit based on the first feedback data.

It should be noted that any combination of the components described above or any manifestation of the present disclosure may be mutually substituted between a method, apparatus, or the like, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Outline of Embodiments

Figure 1:
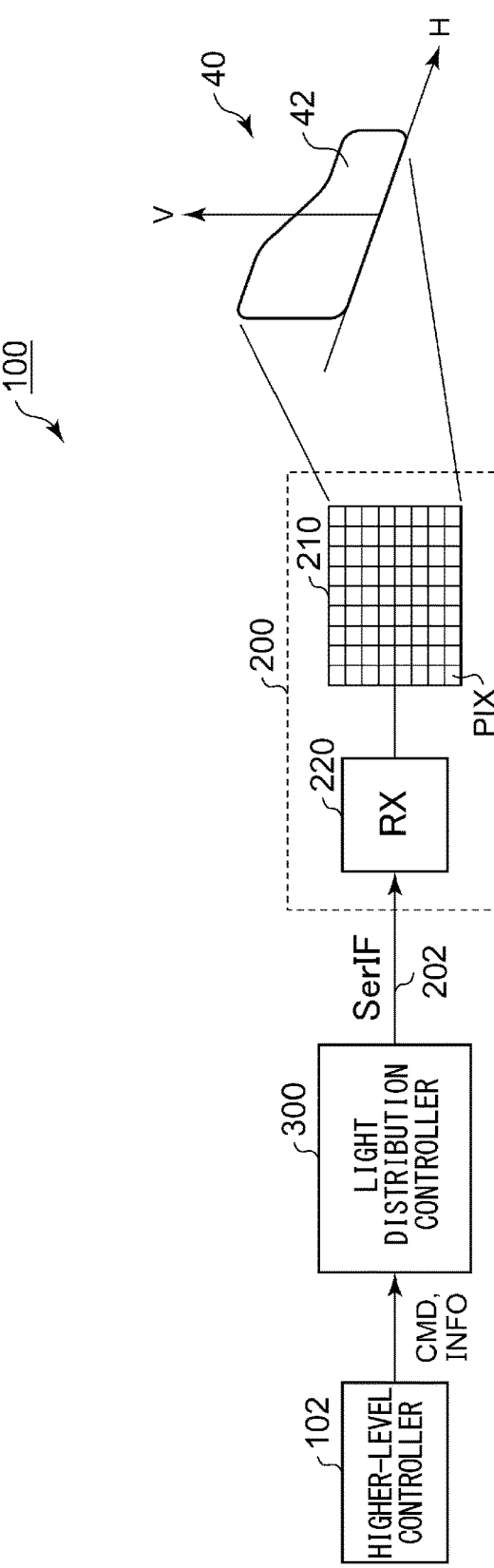
FIG. 1 is a block diagram of a lamp system according to an embodiment.

Description will be made regarding the outline of several exemplary embodiments of the present disclosure. The outline is a simplified explanation regarding several concepts of one or multiple embodiments as a preface to the detailed description described later in order to provide a basic understanding of the embodiments. That is to say, the outline described below is by no means intended to restrict the scope of the present invention and the present disclosure. Furthermore, the outline described below is by no means a comprehensive outline of all possible embodiments. That is to say, the outline is by no means intended to identify the indispensable or essential elements of all the embodiments, and is by no means intended to define the scope of a part of or all the embodiments. For convenience, in some cases, an "embodiment" as used in the present specification represents a single or multiple embodiments (examples and modifications) disclosed in the present specification.

A lamp controller according to one embodiment is structured to control a patterning device including multiple controllable elements. The lamp controller includes: a drawing processing unit structured to generate multi-gradation light distribution image data that defines a light distribution; a device interface circuit structured to convert the light distribution image data into a serial interface signal having a signal format required by the patterning device, and to transmit the serial interface signal to the patterning device; and an auxiliary processor. The drawing processing unit is adaptive to execute multiple software processes sequentially, to execute self-diagnosis for the presence or absence of an abnormality for each software process, to transmit first diagnostic data indicative of a self-diagnosis result to the auxiliary processor, and to transmit first feedback data based on data generated for each software process to the auxiliary processor. The auxiliary processor is adaptive to execute diagnosis for the presence or absence of an abnormality in the multiple software processes executed in the drawing processing unit based on the first feedback data.

The drawing processing unit performs self-diagnosis of a software process executed by the drawing processing unit itself. The auxiliary processor, which is independent of the drawing processing unit, detects an abnormality for each software process executed by the drawing processing unit using the first feedback data based on the data generated by the drawing processing unit. With this, such an arrangement is capable of multiplexing the abnormality diagnosis results for each software process executed by the drawing processing unit.

In one embodiment, the multiple software processes may include a process for receiving input control information from a higher-level controller.

In one embodiment, the multiple software processes may include a process for determining a light distribution pattern based on input control information from a higher-level controller. Also, the first feedback data may include data that describes a feature of the light distribution pattern. This allows the auxiliary processor to detect an abnormality in the light distribution pattern determination process.

In one embodiment, the multiple software processes may include a process for loading the light distribution pattern into memory as image data. Also, the first feedback data may include data that describes a feature of the image data. This allows the auxiliary processor to detect an abnormality in the image data generating process.

In one embodiment, the multiple software processes may include a process for converting the image data into a format that can be processed by the device interface circuit, and for outputting the image data. Also, the first feedback data may include at least one of a control command for the device interface circuit and a data frame to be transmitted to the device interface circuit. This allows the auxiliary processor to detect an abnormality in data conversion, i.e., the encoding process.

In one embodiment, upon detecting an abnormality in any one of the multiple software processes in the drawing processing unit, the auxiliary processor may execute a recovery process to be applied to a thread relating to the process in which the abnormality has been detected. This allows only a local process/thread to be restarted, thereby restoring the lamp controller in a short period of time without restarting the overall operation of the lamp controller.

In one embodiment, the drawing processing unit and the auxiliary processor may be coupled via a Serial Peripheral Interface (SPI). Also, the first feedback data may be packetized in a SPI frame, and may be transmitted to the drawing processing unit.

In one embodiment, the device interface circuit may include multiple blocks structured to sequentially execute multiple hardware processes, and is structured to execute diagnosis for the presence or absence of an abnormality for each block, and to transmit second diagnostic data indicative of a self-diagnosis result to the auxiliary processor together with second feedback data based on data generated for each block. Also, the auxiliary processor may be structured to execute diagnosis for the presence or absence of an abnormality for each of the multiple blocks of the device interface circuit based on the second feedback data.

The device interface circuit performs self-diagnosis for the hardware processes executed by the multiple blocks. Furthermore, the auxiliary processor independent of the device interface circuit detects an abnormality in each hardware process executed by the device interface circuit using the second feedback data based on the data generated by the device interface circuit. With this, such an arrangement is capable of multiplexing the abnormality diagnosis results for each hardware process executed by the multiple blocks of the device interface circuit.

In one embodiment, the drawing processing unit and the auxiliary processor may be coupled via a Serial Peripheral Interface (SPI). Also, the drawing processing unit and the device interface circuit may be coupled via an Inter IC ($I^2C$) interface. Also, the second diagnostic data and the second feedback data may be transmitted from the device interface circuit to the drawing processing unit via the $I^2C$ interface, and subsequently, the second diagnostic data and the second feedback data may be transmitted from the drawing processing unit to the auxiliary processor.

In one embodiment, the patterning device may be configured as a micro LED.

Embodiments

Description will be made below regarding the preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present disclosure or the present invention. Also, it is not necessarily essential for the present disclosure and the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

FIG. 1 is a block diagram showing a lamp system 100 according to an embodiment. The lamp system 100 is configured as a variable light distribution lamp such as an ADB lamp, road surface drawing lamp, etc. The lamp system 100 includes a higher-level controller 102, a patterning device 200, and a lamp controller 300.

The patterning device 200 includes an LED array (which is also referred to as a "micro LED") 210 that functions as a spatial light modulator and an interface circuit 220. The LED array 210 includes n multiple controllable elements (which will be referred to as "light-emitting pixels PIX" hereafter) each configured to be individually switchable between the on state (lighting-on state) and the off state (lighting-off state). Each light-emitting pixel PIX may include a semiconductor light-emitting element such as an LED or the like and a current source that supplies a driving current to the semiconductor light-emitting element.

The output beam of the LED array 210 is emitted onto a virtual vertical screen 40 via an unshown optical system. A light distribution pattern 42 that corresponds to the on states and the off states of the multiple light-emitting pixels PIX is formed on the virtual vertical screen 40.

The interface circuit 220 includes a serial format receiver. The interface circuit 220 is coupled to the lamp controller 300 via a serial signal line 202. The patterning device 200 receives a serial interface signal SerIF from the lamp controller 300. The serial interface signal SerIF thus received includes control information for the multiple light-emitting pixels PIX of the LED array 210.

The interface circuit 220 controls the light intensity of each of the multiple light-emitting pixels PIX1 through PIXn that form the LED array 210 in a multi-gradation (multi-tone) manner based on the serial interface signal SerIF.

The lamp controller 300 controls the patterning device 200 so as to form the desired light distribution pattern 42. In addition to the lighting command CMD from the higher-level controller 102, the lamp controller 300 receives the supply of information INFO required to generate the light distribution pattern 42. The lamp controller 300 will be referred to as a lamp ECU (Electronic Control Unit). Furthermore, the higher-level controller 102 will be referred to as a vehicle ECU (Electronic Control Unit). It should be noted that the higher-level controller 102 may be provided within the lamp. The lamp controller 300 receives the input of the lighting command CMD for indicating the on/off state of the low beam or high beam from the higher-level controller 102.

Also, the information INFO to be supplied from the higher-level controller 102 to the lamp controller 300 may include surrounding environment information and vehicle information. Examples of such surrounding environment information can include: (i) information with respect to objects such as leading vehicles, oncoming vehicles, pedestrians, road signs, delineators, etc.; (ii) road information (classification as an expressway, general road, suburban area, urban area, etc., information on whether a roadway is straight or curved, etc.); and (iii) information with respect to the weather, visibility, roadway surface condition, etc. Examples of the vehicle information can include vehicle speed, steering angle, and vehicle tilt angle, etc.

The lamp controller 300 determines the light distribution pattern based on the vehicle information. Furthermore, the lamp controller 300 controls the patterning device 200 so as to provide the light distribution pattern thus determined.

Figure 2:
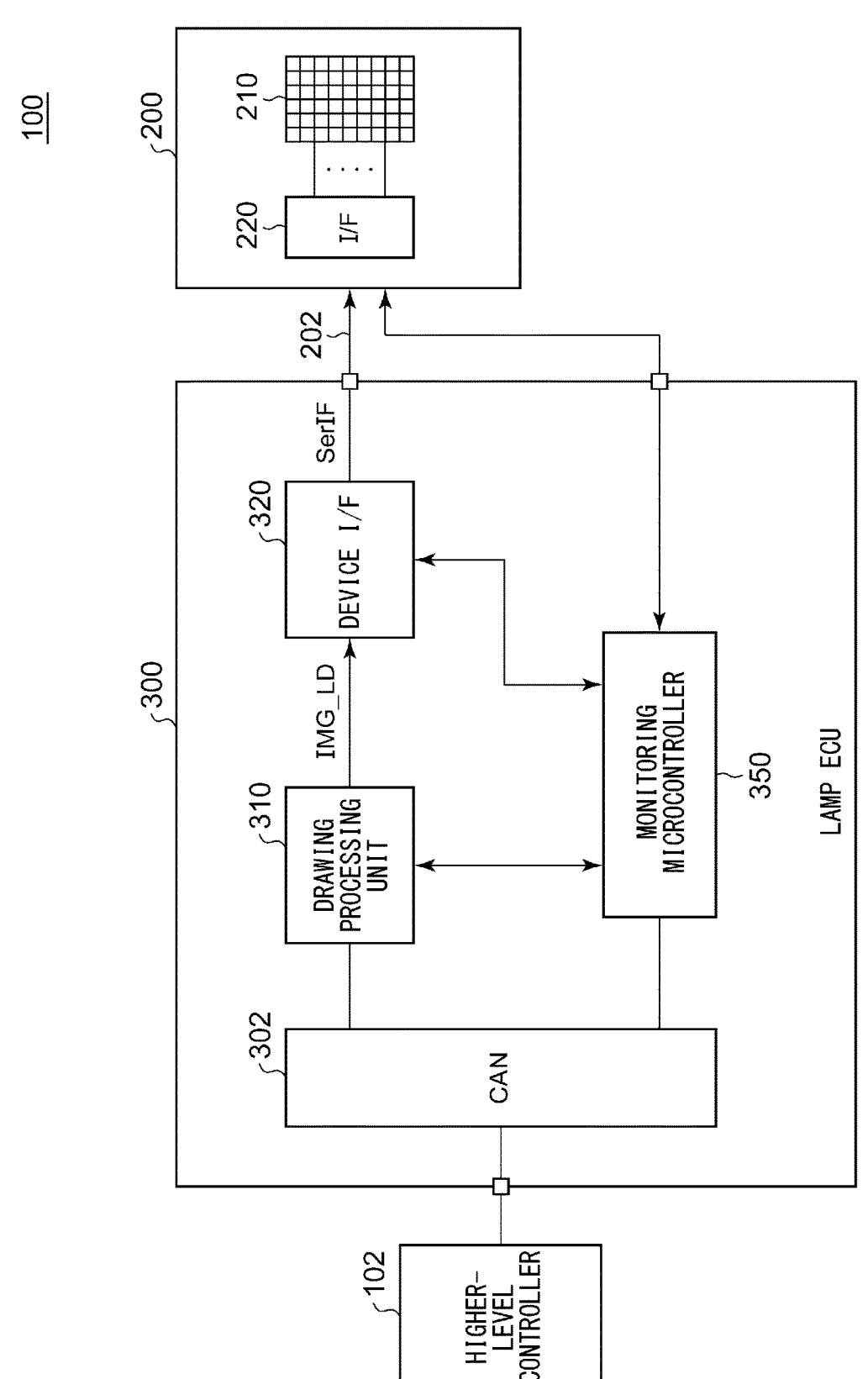
FIG. 2 is a block diagram of a lamp system provided with a lamp controller according to an embodiment.

FIG. 2 is a block diagram of the lamp system 100 including the lamp controller 300 according to an embodiment.

First, description will be made regarding the patterning device 200 to be controlled by the lamp controller 300. As described above, the patterning device 200 includes the LED array 210 and the interface circuit 220. The light-emitting pixels PIX of the LED array 210 are each configured to be switchable between two states, i.e., the on state and the off state. The patterning device 200 changes the on time (duty cycle) per cycle (which will be referred to as "one frame")

using PWM control so as to express the brightness of each pixel in a multi-gradation manner.

The interface circuit 220 includes a serial format receiver. The interface circuit 220 is coupled to the lamp controller 300 via a serial signal line 202. The patterning device 200 receives a serial interface signal SerIF from the lamp controller 300. The serial interface signal SerIF thus received includes the light intensity information with respect to the multiple light-emitting pixels PIX of the LED array 210.

The interface circuit 220 generates PWM control signals PWM_PIX1 through PWM_PIXn that correspond to the multiple light-emitting pixels PIX1 through PIXn based on the serial interface signal SerIF. The i-th light-emitting pixel PIXi is on/off controlled based on the corresponding PWM control signal PWM_PIXi.

Next, description will be made regarding the configuration of the lamp controller 300.

The lamp controller 300 generates light distribution image data IMG_LD that defines the light distribution pattern 42 based on the information INFO from the higher-level controller 102. Furthermore, the lamp controller 300 converts the light distribution image data IMG_LD into the serial interface signal SerIF, and transmits the serial interface signal SerIF to the patterning device 200. The lamp controller 300 and the patterning device 200 are coupled via the serial signal line 202.

The lamp controller 300 includes a vehicle bus interface 302, a drawing processing unit (drawing engine) 310, a device interface circuit 320, and an auxiliary processor 350.

The vehicle bus interface 302 is configured as a Controller Area Network (CAN), Local Interconnect Network (LIN), or the like. The vehicle bus interface 302 is provided in order to support communication with the higher-level controller 102 or other devices.

The drawing processing unit 310 generates the multi-gradation light distribution image data IMG_LD that defines the light distribution of a variable light distribution lamp. The light distribution image data IMG_LD of each pixel defines the brightness of a corresponding portion of the light distribution pattern 42. The patterning device 200 supports gradation control based on PWM control. Each pixel of the LED array 210 is PWM controlled based on the PWM control signal PIX_PWM. Accordingly, it can be said that the light distribution image data IMG_LD of each pixel defines the duty cycle, i.e., the pulse width, of the PWM control signal PIX_PWM for the corresponding light-emitting pixel PIX of the LED array 210.

The drawing processing unit 310 is configured based on software. Specifically, the drawing processing unit 310 may be provided as a combination of a software program, a processor that executes the software program, and a peripheral device. Accordingly, the drawing processing unit 310 is configured as a microcontroller or a System on Chip (SoC). By executing the software program, the drawing processing unit 310 executes multiple processes (which will be referred to as "software processes" hereafter).

The device interface circuit 320 converts the light distribution image data IMG_LD into a serial interface signal SerIF having a signal format required by the interface circuit 220 of the patterning device 200. The device interface circuit 320 may be configured based on hardware. For example, the device interface circuit 320 may be configured as a logic circuit (digital circuit) or a Field Programmable Gate Array (FPGA). However, the present invention is not restricted to such arrangements.

The auxiliary processor 350 is configured as a monitoring microcontroller that monitors the occurrence of an abnormality in the lamp controller 300 or the patterning device 200. The auxiliary processor 350 is configured as an individual hardware component that differs from the drawing processing unit 310 and the device interface circuit 320. The auxiliary processor 350 is configured based on software. Specifically, the auxiliary processor 350 can be implemented as a combination of a software program, a processor that executes the software program, and a peripheral device. It should be noted that the auxiliary processor 350 does not directly handle image data. Accordingly, the auxiliary processor 350 is provided with low processing power as compared with the drawing processing unit 310. Accordingly, a low-cost processor can be employed as the auxiliary processor 350. A function of the vehicle bus interface 302 may be implemented in the auxiliary processor 350.

The drawing processing unit 310, the device interface circuit 320, and the patterning device 200 are each provided with a self-diagnosis function, and each transmit data that indicates the diagnostic results to the auxiliary processor 350. The auxiliary processor 350 collects the diagnostic information from the drawing processing unit 310, the device interface circuit 320, and the patterning device 200. Furthermore, as described later, the auxiliary processor 350 is configured as an external diagnostic component that diagnoses an abnormality that can occur in the drawing processing unit 310 and the device interface circuit 320. The diagnostic results obtained by the auxiliary processor 350 are transmitted to the higher-level controller 102 via the vehicle bus interface 302 or a different path.

Figure 3:
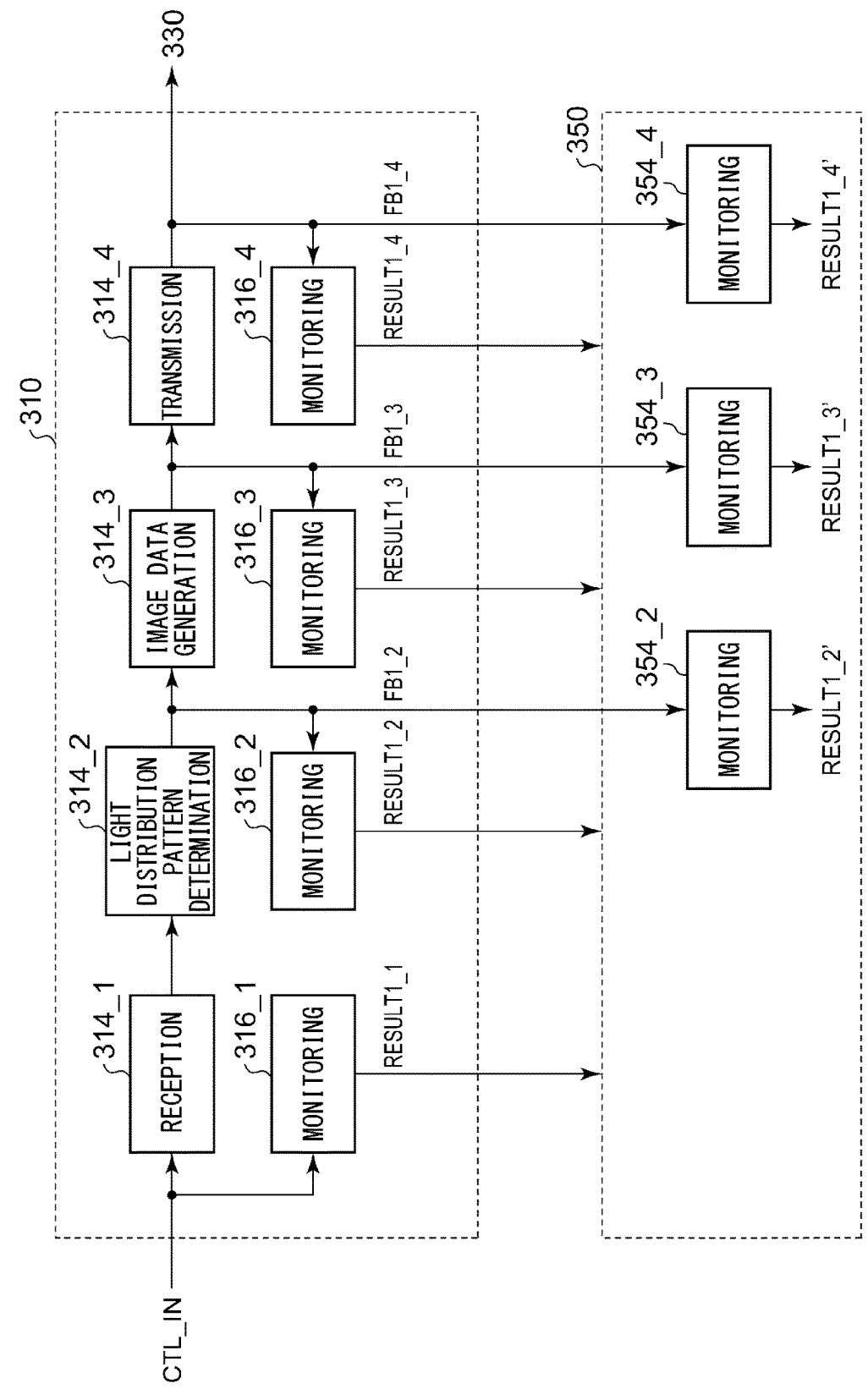
FIG. 3 is a function block diagram relating to a drawing processing unit and an auxiliary processor of the lamp controller.

FIG. 3 is a function block diagram relating to the drawing processing unit 310 and the auxiliary processor 350 of the lamp controller 300. FIG. 3 shows functions and processing implemented in the drawing processing unit 310 and the auxiliary processor 350.

The drawing processing unit 310 executes multiple software processes 314_1 through 314_4.

The software process 314_1 is a process configured to receive input control information CTL_IN from the higher-level controller 102. As described later, the input control information CTL_IN may be input via SPI communication through the auxiliary processor 350.

The input control information CTL_IN includes at least one of the information items described below.

Swivel Information

Specific examples of the swivel information include the swivel angle, swivel sign (direction), lighting-on speed, etc.

Beam Mode

Specific examples of the beam mode include the off mode, high-beam lighting-on mode, low-beam lighting-on mode, high/low adaptive switching mode, light dimming/increasing switching speed, etc.

Basic Shielding Information

Specific examples of the basic shielding information include the position information with respect to the shielded region, the position information with respect to the illumination region, i.e., the right end, the left end, the upper end, and the lower end thereof, shielding beam on/off speed, parallax correction angle, etc.

The software process 314_2 includes a light distribution pattern determination process that determines the light distribution pattern based on the input control information CTL_IN. The light distribution pattern is determined with reference to the information of whether the lamp is a right lamp or a left lamp, the vehicle speed, weather conditions, shielding angle, etc.

The software process 314_3 is configured as an image data generating process that loads the light distribution pattern into the memory as image data (light distribution image data IMG_LD).

The software process 314_4 is configured as a transmission process that converts the image data IMG_LD into a format that can be processed by the device interface circuit 320 configured as a downstream stage, and outputs the image data IMG_LD thus converted.

Multiple monitoring functions (which will be referred to as "monitoring processing units" hereafter) 316_1 through 316_4 relating to the software processes 314_1 through 314_4 are implemented in the drawing processing unit 310.

The monitoring processing unit 316_1 detects an abnormality in the software process 314_1. Specifically, the monitoring processing unit 316_1 monitors a part of or all of the items of the control input information CTL_IN, and judges the presence or absence of an abnormality in the software process 314_1.

The monitoring processing unit 316_2 detects an abnormality in the software process 314_2. Specifically, the monitoring processing unit 316_2 judges the presence or absence of an abnormality in the software process 314_2 based on the data generated by the software process 314_2. For example, the data generated by the software process 314_2 includes information to be used to judge what light distribution pattern is to be used for illumination based on the control input information CTL_IN information. The monitoring processing unit 316_2 may compare such data with an expected value or an expected range so as to judge the occurrence of an abnormality.

The monitoring processing unit 316_3 detects an abnormality in the software process 314_3. Specifically, the monitoring processing unit 316_3 judges the presence or absence of an abnormality in the software process 314_3 based on the data generated by the software process 314_3. For example, the data generated by the software process 314_3 includes image display information, i.e., drawing data generated based on light distribution pattern judgment with shielding information and illumination intensity information as additional information. The monitoring processing unit 316_3 may compare such data with an expected value or an expected range so as to judge the occurrence of an abnormality.

The monitoring processing unit 316_4 detects an abnormality in the software process 314_4. Specifically, the monitoring processing unit 316_4 judges the presence or absence of an abnormality in the software process 314_4 based on the data generated by the software process 314_4. For example, the data generated by the software process 314_4 includes command control information to be used to transmit the image display information to the patterning device, transfer frame generation information, etc. The monitoring processing unit 316_4 may compare such data with an expected value or an expected range so as to judge the occurrence of an abnormality.

The first diagnostic data RESULT1_1 through RESULT1_4, which indicate the monitoring results acquired by the monitoring processing units 316_1 through 316_4, are transmitted to the auxiliary processor 350. Furthermore, the drawing processing unit 310 transmits first feedback data FB1 together with the first diagnostic data RESULT1_1 through RESULT1_4. The first feedback data FB1 may include final data generated by at least one of the multiple software processes 314. In this example, the final data (output data) generated by the software processes 314_2 through 314_4 is transmitted to the auxiliary processor 350 as the first feedback data FB1_2 through FB1_4. It should be noted that, in addition to or instead of the final data, intermediate data generated in each software process may be employed as the first feedback data FB1.

For example, the first feedback data FB1_# ("#"=1 to 4) may include data to be used as reference data when the corresponding monitoring processing unit 316_#detects the occurrence of an abnormality.

For example, the first feedback data FB1_2 relating to the software process 314_2 may include data that describes the features of the light distribution pattern determined in the software process 314_2.

For example, the first feedback data FB1_3 relating to the software process 314_3 may include data that describes the light distribution image data IMG_LD drawn in the software process 314_3. Specifically, the first feedback data FB1_3 includes the position information with respect to the shielding area, light intensity information with respect to the illumination area, or the presence or absence of such information.

For example, the first feedback data FB1_4 relating to the software process 314_4 may include at least one of a control command for the device interface circuit 320 and a data frame to be transmitted to the device interface circuit 320.

The auxiliary processor 350 is capable of executing diagnosis for the presence or absence of an abnormality in the multiple software processes 314_2 through 314_4 executed in the drawing processing unit 310 based on the first feedback data FB1_2 through FB1_4. The auxiliary processor 350 is provided with multiple monitoring functions (monitoring processing units) 354_2 through 354_4. The j-th (j=1, 2) monitoring processing unit 354_j detects an abnormality in the corresponding software process 314_j based on the corresponding first feedback data FB1_j.

Here, the monitoring processing unit 354 of the auxiliary processor 350 preferably supports simple processing as compared with the processing supported by the monitoring processing unit 316 of the drawing processing unit 310. The drawing processing unit 310 is configured using a high-performance processor 316. Accordingly, there is no problem even if the processing supported by the monitoring processing unit 316_i of the drawing processing unit 310 involves a relatively large amount of calculation. On the other hand, the auxiliary processor 350 is configured as a processor with low performance. Accordingly, the processing of the monitoring processing unit 354 is designed such that it involves only a light load on its CPU. Accordingly, the processing of the monitoring processing unit 354 is designed with a relatively small amount of calculation.

For example, the monitoring processing unit 316_i on the drawing processing unit 310 side may be designed to provide processing based on the calculation result acquired by the corresponding software process 314_i, based on expected value matching, judgment thereof with reference to its range, or judgment thereof with reference to behavior constraints of the calculation result.

On the other hand, the monitoring processing unit 354_j on the auxiliary processor 350 side judges the presence or absence of an abnormality in each software process 314_j based on the corresponding first feedback data FB1_j, based on expected value matching or the like using a matrix table or the like.

The above is the abnormality monitoring processing supported by the drawing processing unit 310 and the abnormality monitoring processing supported by the auxiliary processor 350.

With the lamp controller 300 according to the present embodiment, in the control of the patterning device 200 based on various kinds of information received by the vehicle bus interface 302, the subdivided software processes 314_1 through 314_4 are monitored. With such an arrangement in which both the auxiliary processor 350 and the drawing processing unit 310 are employed so as to enhance and execute the monitoring function for the calculation results, control signals, etc., this allows the occurrence of an abnormality to be detected quickly.

With this, by executing processing for avoiding the occurrence of an abnormality due to a malfunction from which recovery is possible, such an arrangement is capable of suppressing the system failure rate. This provides improved availability, thereby building a system with improved safety.

For example, in a case in which an abnormality has been detected in a calculation in a given software process 314_i by at least one from among the monitoring processing unit 316_i and the monitoring processing unit 354_i, the thread of the software process 314_i is restarted (restored). Accordingly, such an arrangement is capable of avoiding the occurrence of a failure, such as a visibility failure or the like due to an erroneous light distribution caused by an abnormality that occurs in a calculation, without the loss of the overall operation of the lamp system 100. This allows the lamp system 100 to operate continuously, thereby providing a lamp that does not readily turn off.

In particular, with such an arrangement in which the occurrence of an abnormality is monitored in a redundant manner by means of two physically different and completely independent processors, i.e., the drawing processing unit 310 and the auxiliary processor 350, this provides improved availability and maintenance of safety.

Figure 4:
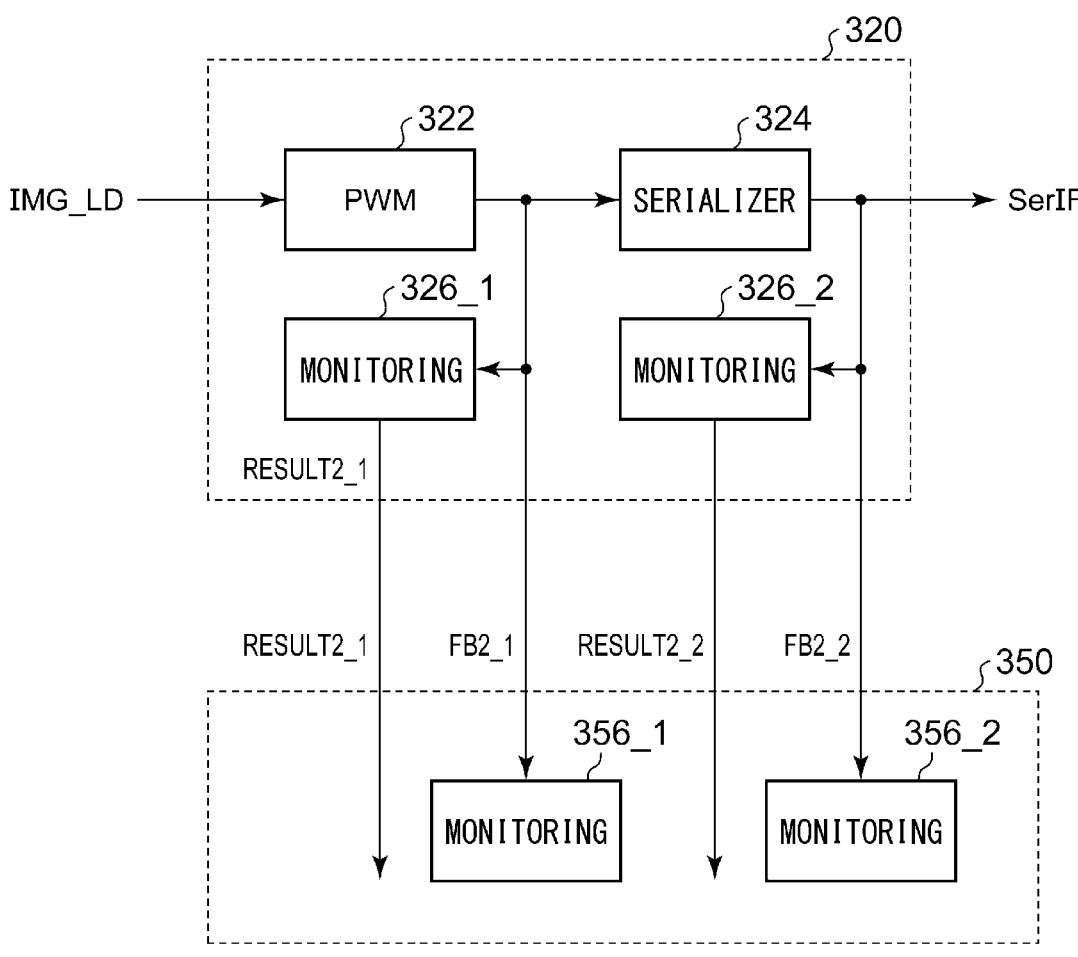
FIG. 4 is a function block diagram relating to a device interface circuit and the auxiliary processor of the lamp controller.

FIG. 4 is a function block diagram relating to the device interface circuit 320 and the auxiliary processor 350 of the lamp controller 300. FIG. 4 shows the functions and processing implemented in the device interface circuit 320 and the auxiliary processor 350.

The device interface circuit 320 is provided with multiple hardware blocks configured to execute multiple hardware processes. In this example, one of the hardware blocks is a pulse width modulator 322, and another is a serializer 324. The pulse width modulator 322 generates n PWM control signals PWM_PIX1 through PWM_PIXn that correspond to n pixels p1 through pn of the light distribution image data IMG_LD. The pulse width modulator 322 may generate a carrier signal having a sawtooth waveform or a triangle waveform. Also, the pulse width modulator 322 may compare the carrier signal with the pixel value so as to generate the PWM control signal PWM_PIX.

The serializer 324 converts n intermediate codes MC1 through MCn into a serial interface signal SerIF.

The monitoring circuit 326_1 judges the presence or absence of an abnormality in the pulse width modulator 322. Furthermore, the monitoring circuit 326_2 judges the presence or absence of an abnormality in the serializer 324. The second diagnostic data RESULT2_1 and RESULT2_2 that indicate the judgment results obtained by the monitoring circuits 326_1 and 326_2 are transmitted to the auxiliary processor 350.

In addition to the second diagnostic data RESULT2_1 and RESULT2_2, the device interface circuit 320 transmits second feedback data FB2 to the auxiliary processor 350. The second feedback data FB2 may include final data generated for each block (pulse width modulator 322 and serializer 324). In this example, the final signals (output data) generated in the pulse width modulator 322 and the serializer 324 are transmitted to the auxiliary processor 350 as the second feedback data FB2_1 and FB2_2. It should be noted that, in addition to or instead of the final data, an intermediate signal generated in each hardware process may be employed as the second feedback data FB2.

The auxiliary processor 350 is capable of executing diagnosis for the presence or absence of an abnormality in the multiple hardware blocks 322 and 324 of the device interface circuit 320. The auxiliary processor 350 is provided with multiple monitoring functions (monitoring processing units) 356_1 and 356_2. The j-th ("j"=1, 2) monitoring processing unit 356_j detects an abnormality in the corresponding hardware block 322 or 324 based on the corresponding second feedback data FB2_j.

Here, the monitoring processing unit 356 of the auxiliary processor 350 preferably supports simple processing as compared with the processing supported by the monitoring circuit 326 of the device interface circuit 320. Specifically, the monitoring processing unit 356_j on the auxiliary processor 350 side judges the presence or absence of an abnormality in the corresponding hardware block 322 or 324 based on the corresponding second feedback data FB2_j, based on expected value matching or the like using a matrix table or the like.

Figure 5:
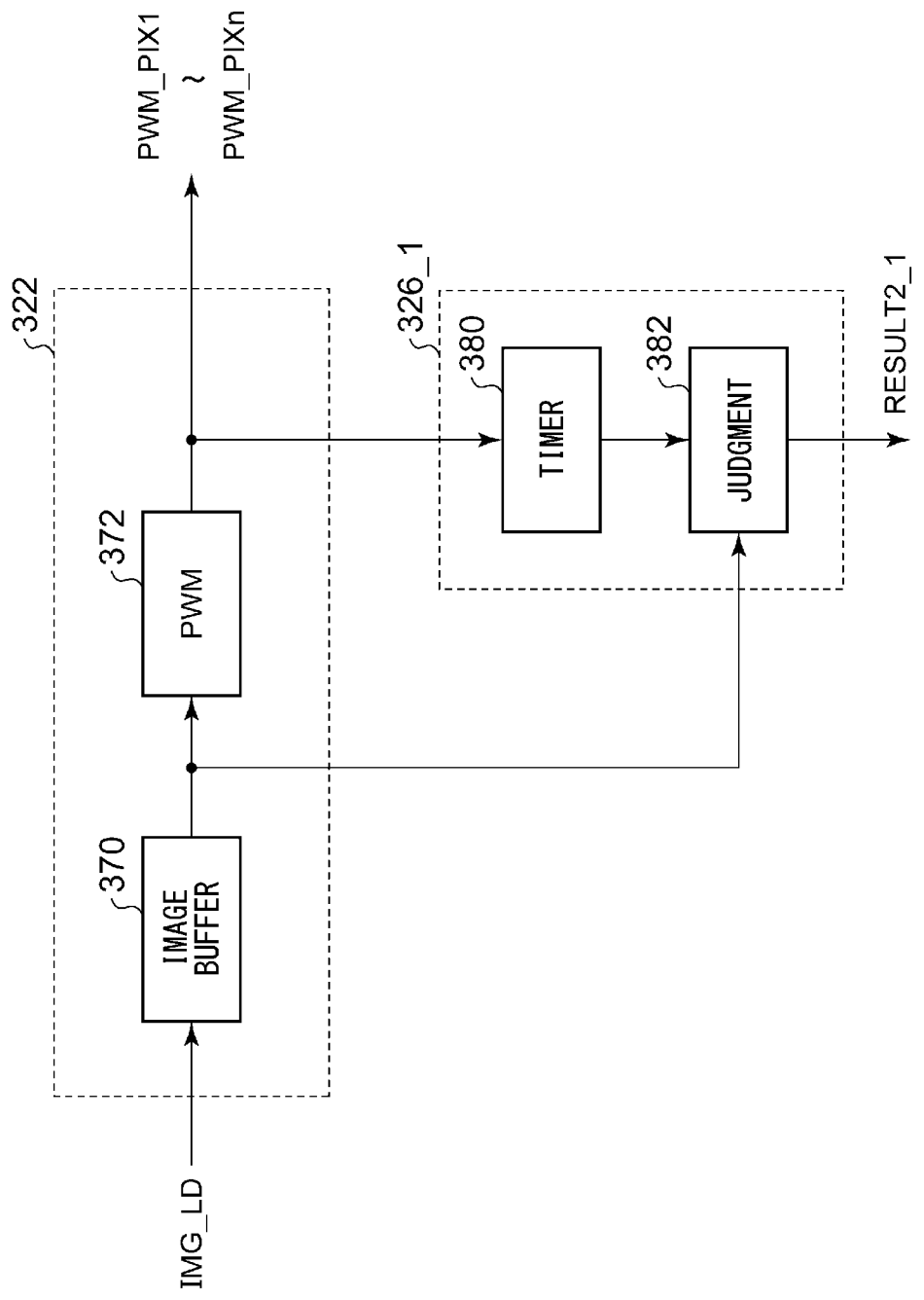
FIG. 5 is a block diagram showing an example configuration of a pulse width modulator and a monitoring circuit.

FIG. 5 is a block diagram showing an example configuration of the pulse width modulator 322 and the monitoring circuit 326_1. The pulse width modulator 322 includes an image buffer 370 and a PWM generation circuit 372. The light distribution image data IMG_LD generated by the drawing processing unit 310 configured as a previous stage is written to the image buffer 370. The PWM generation circuit 372 converts each of the multiple pixels included in the light distribution image data IMG_LD into the PWM signal PWM_PIX.

The monitoring circuit 326_1 includes a timer 380 and a comparator 382. The timer 380 acquires the pulse width or the duty cycle of the PWM control signal PWM_PIX for all of or a part of the multiple pixels included in the light distribution image data IMG_LD. The comparator 382 generates an expected value of the pulse width based on the pixel value input to the PWM generation circuit 372. Subsequently, the monitoring circuit 326_1 judges the presence or absence of an abnormality based on the pulse width measured by the timer 380 and the expected value of the pulse width.

With this configuration, the device interface circuit 320 transmits the frequency or duty cycle information as the second feedback data FB2_1 to be used as the PWM control information to the auxiliary processor 350. In this case, the auxiliary processor 350 judges the matching between the value of the PWM control indicated by the second feedback data FB2_1 and the expected value of the PWM control based on the first feedback data FB1_3 transmitted from the drawing processing unit 310, so as to detect an abnormality in the pulse width modulator 322.

Figure 6:
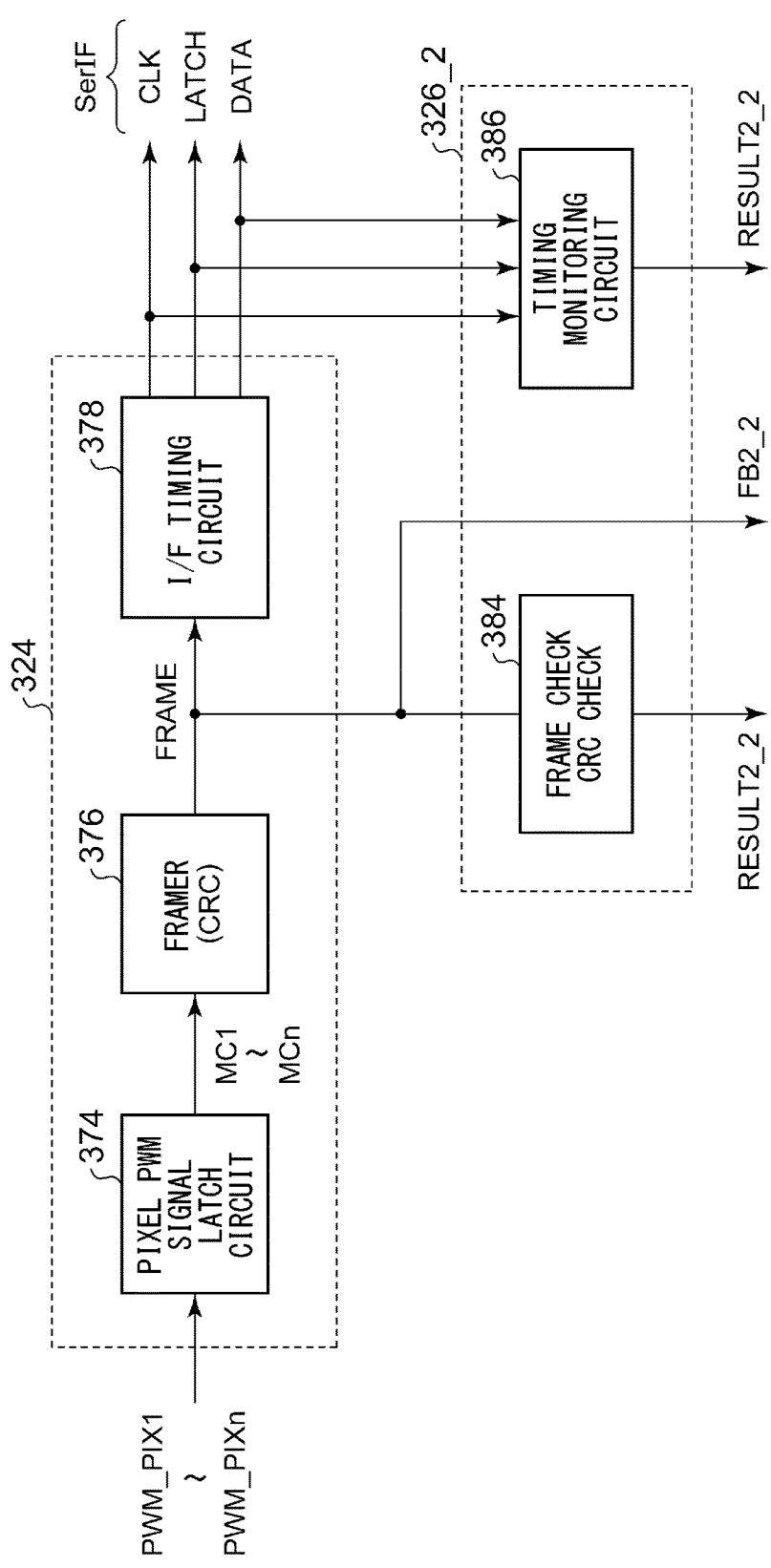
FIG. 6 is a block diagram showing an example configuration of a serializer and the monitoring circuit.

FIG. 6 is a block diagram showing an example configuration of the serializer 324 and the monitoring circuit 326_2. The serializer 324 includes a pixel PWM signal latch circuit 374, a framer 376, and an I/F timing circuit 378.

The pixel PWM signal latch circuit 374 repeatedly latches the PWM control signal PWM_PIX for each pixel at a high speed using a clock signal having a frequency m times the frequency of the PWM control signal PWM_PIX, so as to generate an m-bit intermediate code MC. The number of is included in the j-th (1≤j≤n) intermediate code MCj corresponds to the pixel value of the j-th pixel pj. For example, when the pixel value of the pixel pj is 3, the intermediate code MCj includes three 1s and (m−3) 0s.

The framer 376 receives n intermediate codes MC1 through MCn that correspond to n pixels, and generates m time slots TS1 through TSm (which will also be referred to as "sub-frames"). Subsequently, the framer 376 converts the m time slots TS1 through TSm into a frame signal FRAME.

The I/F timing circuit 378 transmits the frame signal FRAME into the serial interface signal SerIF, and transmits the serial interface signal SerIF to the patterning device 200.

Figure 7:
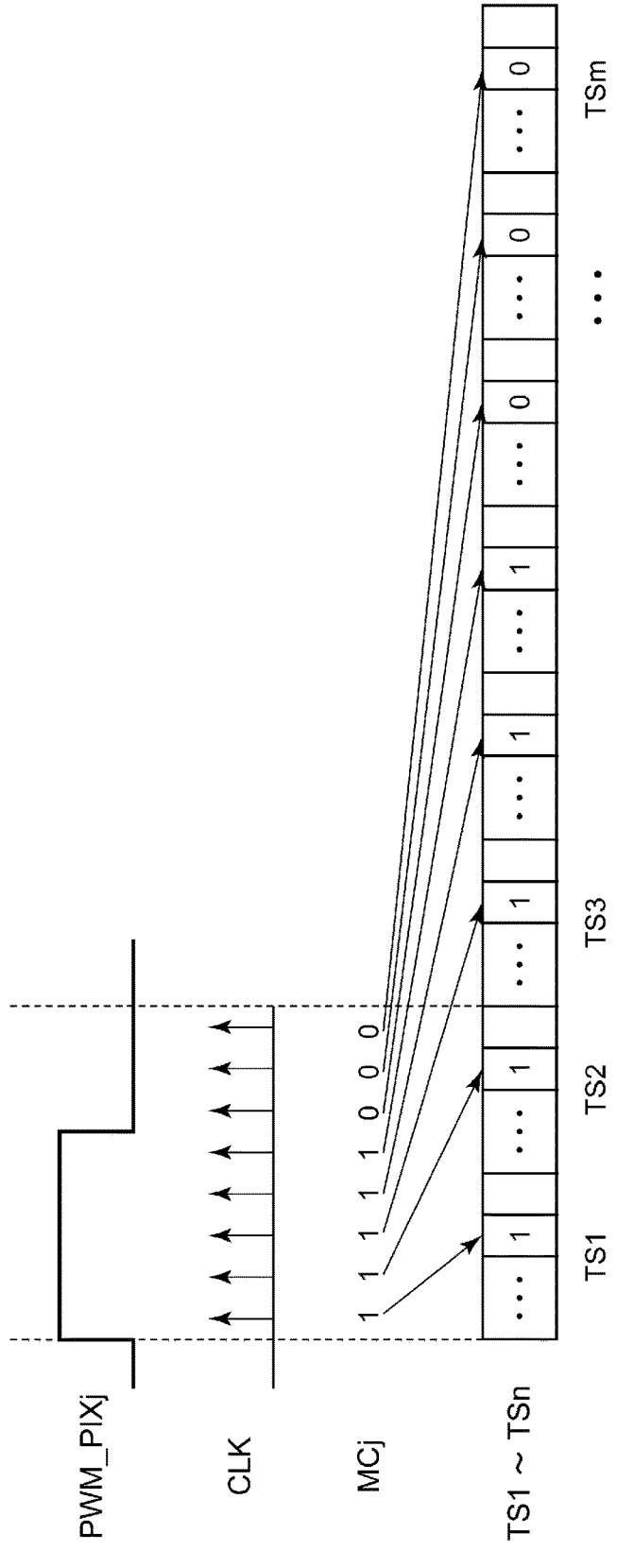
FIG. 7 is a diagram for explaining the operation of a pixel PWM signal latch circuit and a framer.

FIG. 7 is a diagram for explaining the operation of the pixel PWM signal latch circuit 374 and the framer 376. The PWM control signal PWM_PIXj is latched using the clock CLK, so as to generate the intermediate code MCj. The intermediate code MCj is preferably a right-justified or left-justified thermometer code. For example, in a case in which a left-justified thermometer code is employed, when the pixel value of the pixel pj is 4, MCj=[11110000] is generated. When the pixel value of the pixel pj is 7, the left-justified thermometer code MCj=[11111110] is generated. Alternatively, the intermediate code MCj may be designed as a code in which the "1" bits are concentrated in the center.

The j-th bit of the time slot TSi includes the upper i-th bit of the intermediate code MCj. Each time slot TS includes n-bit data. Each pixel of the light distribution image data IMG_LD is assigned to the corresponding one of the n bits of each of the multiple time slots. For example, the first pixel p1 is assigned to the leftmost bit of each time slot TS. The second pixel p2 is assigned to the second bit from the left of each time slot TS. The j-th pixel pj is assigned to the j-th bit from the left of each time slot TS.

The j-th bits of the m time slots TS1 through TSm each store an intermediate code MCj that represents the pixel value of the pixel pj.

Figures 8A, 8B:
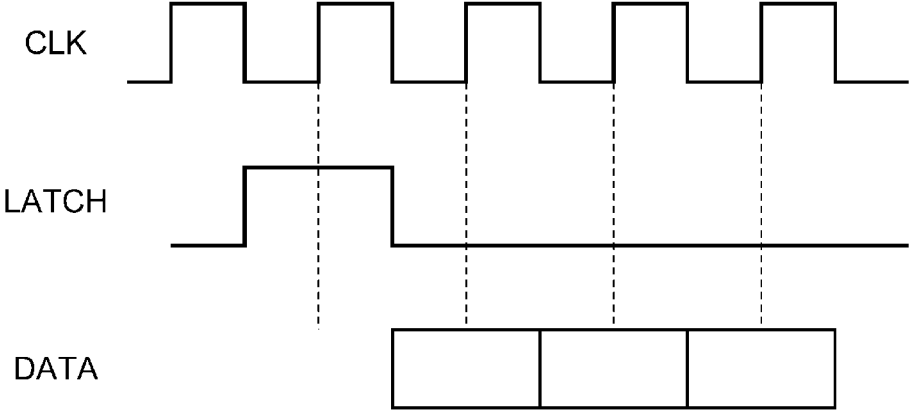
FIGS. 8A and 8B are diagrams showing a frame signal and a serial interface signal.

FIGS. 8A and 8B are diagrams showing the frame signal FRAME and the serial interface signal SerIF. The frame signal FRAME includes a start delimiter, PWM pixel data, a cyclic redundancy check (CRC) code, and an end delimiter. The PWM pixel data is obtained by extracting a part of the time slots TS1 through TSn for every predetermined number of bits (one word).

The frame signal FRAME is converted into the serial interface signal SerIF which includes the clock signal CLK, latch signal LATCH, and data DATA, and is transmitted to the patterning device 200.

Returning to FIG. 6, the monitoring circuit 326_2 includes a frame/CRC check circuit 384 and a timing monitoring circuit 386. The frame/CRC check circuit 384 monitors the frame signal FRAME so as to monitor whether the frame has a correct configuration. That is to say, the frame/CRC check circuit 384 may judge whether the start delimiter at the beginning or the end delimiter at the end has the correct bit value.

Furthermore, the frame/CRC check circuit 384 executes a CRC check, i.e., checks whether the CRC code has a correct value with respect to the PWM pixel data.

The timing monitoring circuit 386 monitors the clock signal CLK, latch signal LATCH, and data signal DATA included in the serial interface signal SerIF, and judges whether or not the timing relation between them is correct.

In this example, the frame signal FRAME may be transmitted as the second feedback signal FB2_2 from the serializer 324 to the auxiliary processor 350. The auxiliary processor 350 performs de-framing of the frame signal FRAME received as the second feedback signal FB2_2, and executes processing such as a CRC check, frame check (data length check), or the like, so as to detect an abnormality.

Next, description will be made regarding an example of a connection between the drawing processing unit 310, the device interface circuit 320, the auxiliary processor 350, and the vehicle bus interface 302.

Figure 9:
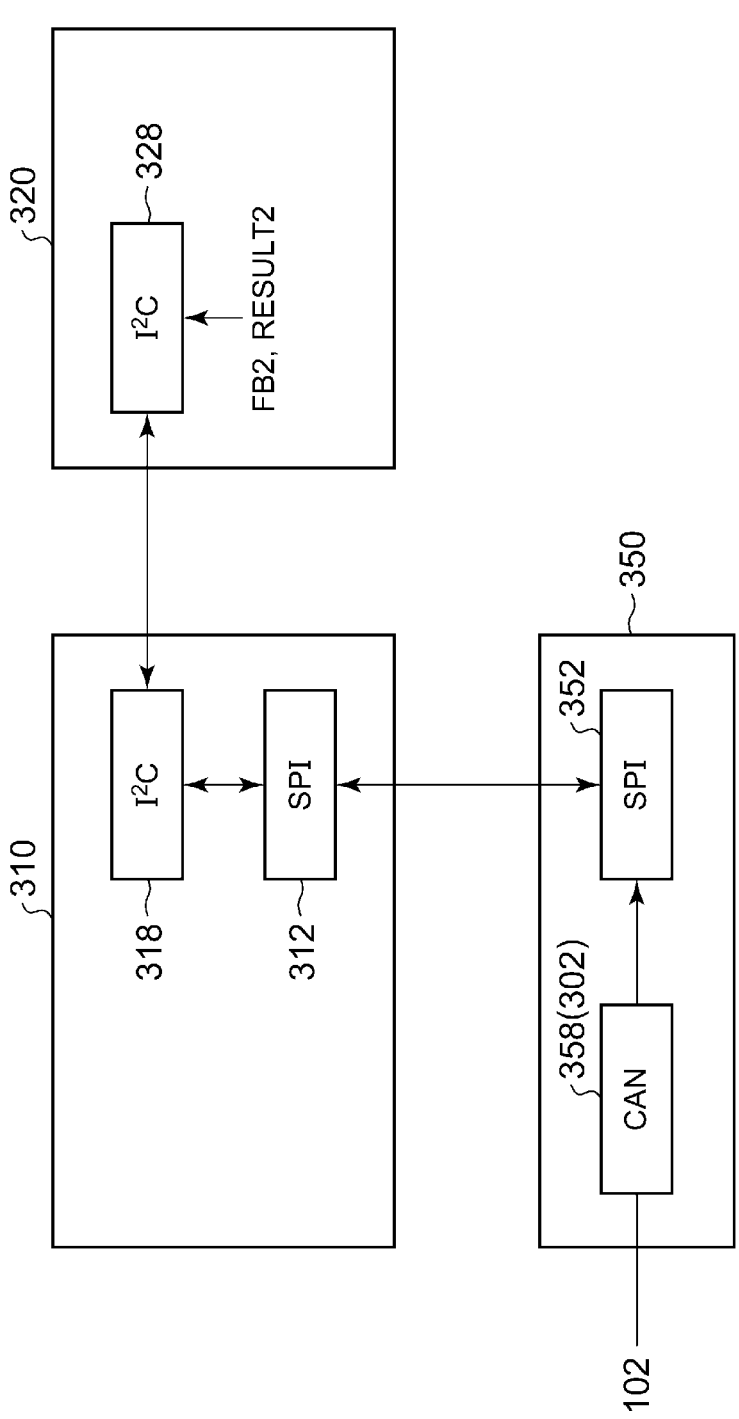
FIG. 9 is a block diagram showing an example configuration of the lamp controller.

FIG. 9 is a block diagram showing an example configuration of the lamp controller 300. In this example configuration, the drawing processing unit 310 and the auxiliary processor 350 are coupled via a serial interface such as a Serial Peripheral Interface (SPI) or the like. The auxiliary processor 350 and the drawing processing unit 310 include serial interface circuits (which will be referred to as "SPI circuits") 352 and 312, respectively, so as to support communication using the serial interface.

Furthermore, in the present embodiment, the function of the vehicle bus interface 302 is implemented as a CAN interface circuit 358 included in the auxiliary processor 350. That is to say, the data input to the lamp controller 300 via the CAN is transmitted to the drawing processing unit 310 by SPI communication via the auxiliary processor 350.

Furthermore, in the example configuration shown in FIG. 9, the drawing processing unit 310 and the device interface circuit 320 are coupled via an I²C interface or the like. The drawing processing unit 310 and the device interface circuit 320 include interface circuits (which will be referred to as "I²C circuits") 318 and 328 configured to support communication using the I²C interface.

The second diagnostic data RESULT2 and the second feedback signal FB2 generated by the device interface circuit 320 are transmitted to the drawing processing unit 310 via the I²C interface. Subsequently, the second diagnostic data RESULT2 and the second feedback signal FB2 are input to the auxiliary processor 350 using SPI communication between the drawing processing unit 310 and the auxiliary processor 350.

Next, description will be made regarding modifications.

Modification 1

The configuration of the patterning device 200 to be controlled by the lamp controller 300 is not restricted in particular. For example, the patterning device 200 may include a light source that generates a beam having a uniform light intensity distribution and a spatial light modulator that patterns the light intensity distribution of the light source. Examples of such a spatial light modulator include a Digital Micromirror Device (DMD), liquid crystal panel, etc.

Modification 2

The format of the serial interface signal SerIF to be transmitted from the device interface circuit 320 to the patterning device 200 is not restricted to such an arrangement described above.

Description has been made regarding the present disclosure with reference to the embodiments using specific terms. However, the above-described embodiments show only an aspect of the mechanisms and applications of the present disclosure and/or the present invention. Rather, various modifications and various changes in the layout can be made without departing from the spirit and scope of the present invention defined in appended claims.

What is claimed is:

1. A lamp controller structured to control a patterning device including a plurality of controllable elements, the lamp controller comprising:
   a drawing processing unit structured to generate multi-gradation light distribution image data that defines a light distribution;
   a device interface circuit structured to convert the light distribution image data into a serial interface signal having a signal format required by the patterning device, and to transmit the serial interface signal to the patterning device; and
   an auxiliary processor,
   wherein the drawing processing unit is adaptive to execute a plurality of software processes sequentially, to execute diagnosis for the presence or absence of an abnormality for each software process, to transmit first diagnostic data indicative of a self-diagnosis result to the auxiliary processor, and to transmit first feedback data based on data generated for each software process to the auxiliary processor,
   and wherein the auxiliary processor is adaptive to execute diagnosis for the presence or absence of an abnormality in the plurality of software processes executed in the drawing processing unit based on the first feedback data.

2. The lamp controller according to claim 1, wherein the plurality of software processes includes a process for determining a light distribution pattern based on input control information from a higher-level controller,
   and wherein the first feedback data includes data that describes a feature of the light distribution pattern.

3. The lamp controller according to claim 1, wherein the plurality of software processes includes a process for loading the light distribution pattern into memory as image data,
   and wherein the first feedback data includes data that describes a feature of the image data.

4. The lamp controller according to claim 1, wherein the plurality of software processes includes a process for converting the image data into a format that can be processed by the device interface circuit, and for outputting the image data,
   and wherein the first feedback data includes at least one of a control command for the device interface circuit and a data frame to be transmitted to the device interface circuit.

5. The lamp controller according to claim 1, wherein, upon detecting an abnormality in any one of the plurality of software processes in the drawing processing unit, the auxiliary processor executes a recovery process to be applied to a thread relating to the process in which the abnormality has been detected.

6. The lamp controller according to claim 1, wherein the drawing processing unit and the auxiliary processor are coupled via a Serial Peripheral Interface (SPI),
   and wherein the first feedback data is packetized in a SPI frame, and is transmitted to the drawing processing unit.

7. The lamp controller according to claim 1, wherein the device interface circuit comprises a plurality of blocks structured to sequentially execute a plurality of hardware processes, and is structured to execute diagnosis for the presence or absence of an abnormality for each block, and to transmit second diagnostic data indicative of a self-diagnosis result to the auxiliary processor together with second feedback data based on data generated for each block, and wherein the auxiliary processor is structured to execute diagnosis for the presence or absence of an abnormality for each of the plurality of blocks of the device interface circuit based on the second feedback data.

8. The lamp controller according to claim 7, wherein the drawing processing unit and the auxiliary processor are coupled via a Serial Peripheral Interface (SPI), wherein the drawing processing unit and the device interface circuit are coupled via an Inter IC (I$^2$C) interface, wherein the second diagnostic data and the second feedback data are transmitted from the device interface circuit to the drawing processing unit via the I$^2$C interface, and subsequently, the second diagnostic data and the second feedback data are transmitted from the drawing processing unit to the auxiliary processor.

9. An automotive lamp system comprising:

a patterning device; and the lamp controller according to claim 1, structured to control the patterning device.

* * * * *